United States Patent [19]

Smit et al.

[11] Patent Number: 4,458,318

[45] Date of Patent: Jul. 3, 1984

[54] CONTROL ARRANGEMENT FOR A VARIABLE PULLEY TRANSMISSION

[75] Inventors: Geoffrey N. Smit, Rancho Palos Verdes, Calif; Scott R. Anderson, Evergreen Park, Shan-Chin Tsai, Arlington Hts., both of Ill.

[73] Assignee: Borg-Warner Corporation, Chicago, Ill.

[21] Appl. No.: 257,036

[22] Filed: Apr. 24, 1981

[51] Int. Cl.³ .................. F16H 9/18; F16H 11/06; F16H 55/54; G05D 17/02

[52] U.S. Cl. ............................ 364/424.1; 74/866; 474/12; 474/18; 474/28

[58] Field of Search ............... 74/689, 857, 865, 866, 74/868; 364/424.1; 474/11, 12, 17, 18, 28; 192/0.092, 3.58

[56] References Cited

U.S. PATENT DOCUMENTS

| | | | |
|---|---|---|---|
| 2,150,456 | 3/1939 | Perrine | 74/870 |
| 3,043,152 | 7/1962 | Karig et al. | 474/18 |
| 3,115,049 | 12/1963 | Moan | 74/868 |
| 3,263,782 | 8/1966 | Smirl et al. | 192/3.58 |
| 3,385,132 | 5/1968 | Browning | 74/689 |
| 3,918,312 | 11/1975 | Espenschied et al. | 74/866 X |
| 4,098,148 | 7/1978 | Wayman | 74/868 X |
| 4,106,367 | 8/1978 | Bouvet | 74/866 |
| 4,152,947 | 5/1979 | Van Deursen et al. | |
| 4,194,608 | 3/1980 | Usui et al. | 192/0.092 |
| 4,241,618 | 12/1980 | Smirl | 474/18 X |
| 4,246,807 | 1/1981 | Kofink | 474/18 X |
| 4,253,347 | 3/1981 | Mizuno et al. | 74/866 X |
| 4,261,229 | 4/1981 | Mizuno et al. | 74/866 |
| 4,274,520 | 6/1981 | Van Der Hardt Aberson | 474/28 X |
| 4,291,594 | 9/1981 | Baudoin | 74/866 X |

FOREIGN PATENT DOCUMENTS

| | | | |
|---|---|---|---|
| 2058256 | 4/1981 | United Kingdom | 474/12 |
| 2058257 | 4/1981 | United Kingdom | 474/12 |

Primary Examiner—Felix D. Gruber
Attorney, Agent, or Firm—Florian S. Gregorczyk

[57] ABSTRACT

A continuously variable transmission (CVT) with adjustable width pulleys has its belt tension and ratio controlled by an electronic-hydraulic system. The CVT also has a fluid-cooled clutch on the output pulley shaft. The engine speed, transmission output speed, throttle position, and gearshift position are sensed, and signals representing this information are passed to a computer. The computer provides set point signals denoting desired engine speed, line pressure, and clutch cooling condition to a control system. An electromechanical valve assembly regulates fluid flow to the CVT primary sheave, to control CVT ratio as a function of the computer provided set engine speed signal. A second electromechanical valve assembly controls the line pressure in the hydraulic system, which is applied to the secondary pulley to maintain belt tension, as a function of the set pressure signal provided by the computer. A solenoid-operated valve, regulated by the control system, either returns waste fluid from the second valve assembly directly to sump, or passes the fluid to the clutch when cooling is indicated.

11 Claims, 12 Drawing Figures

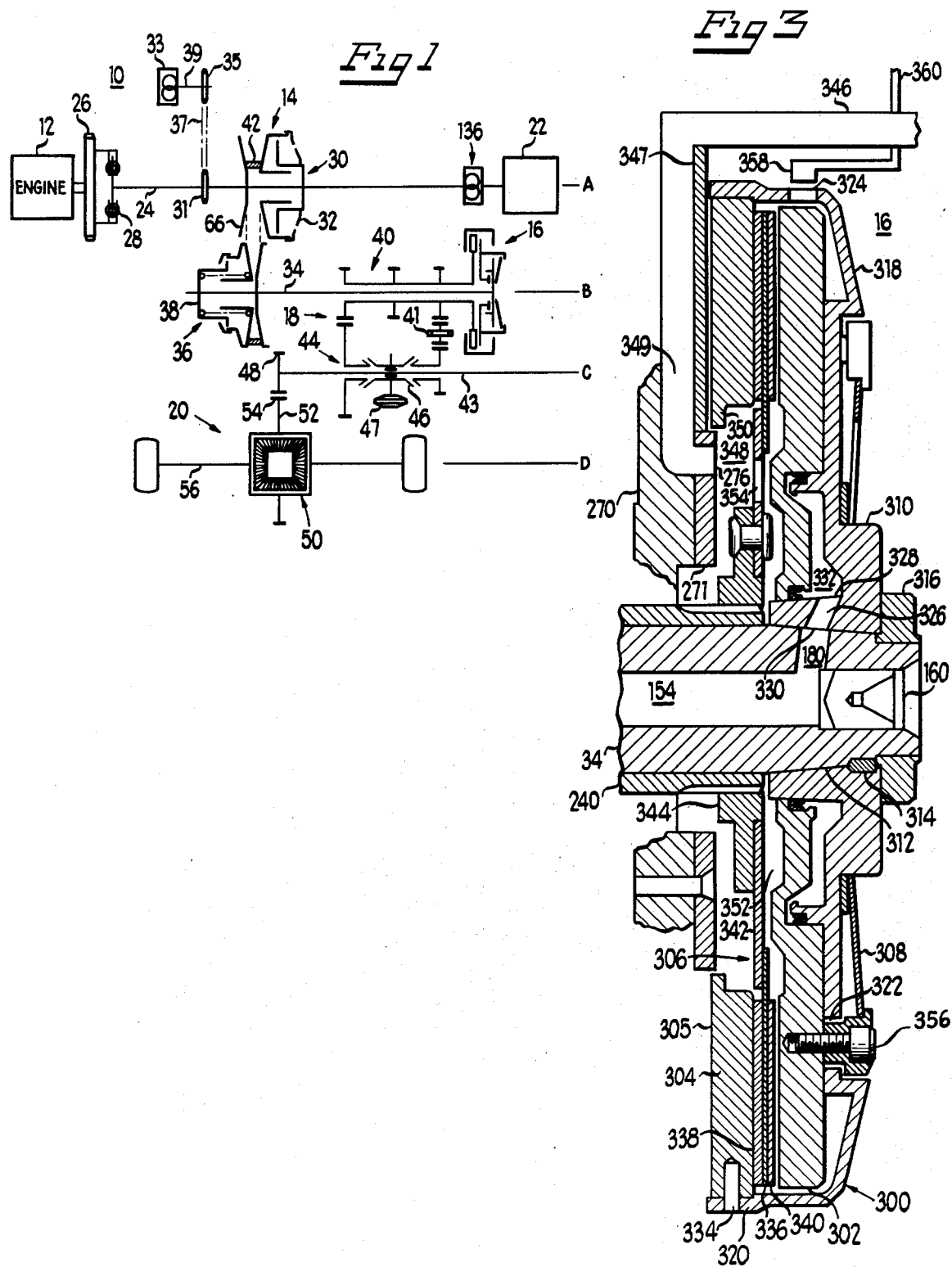

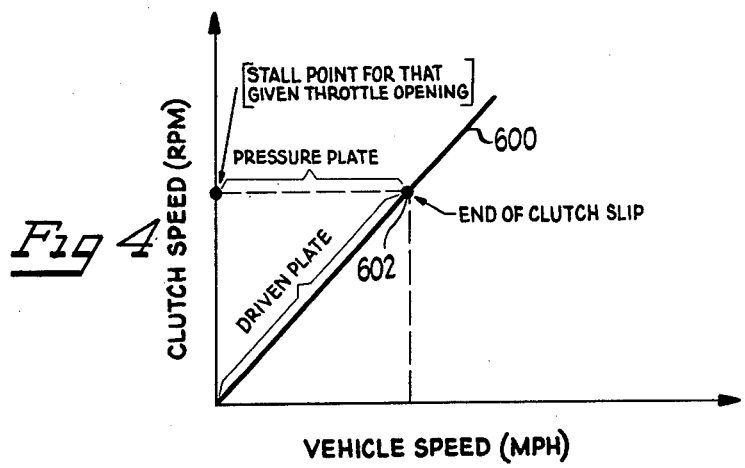
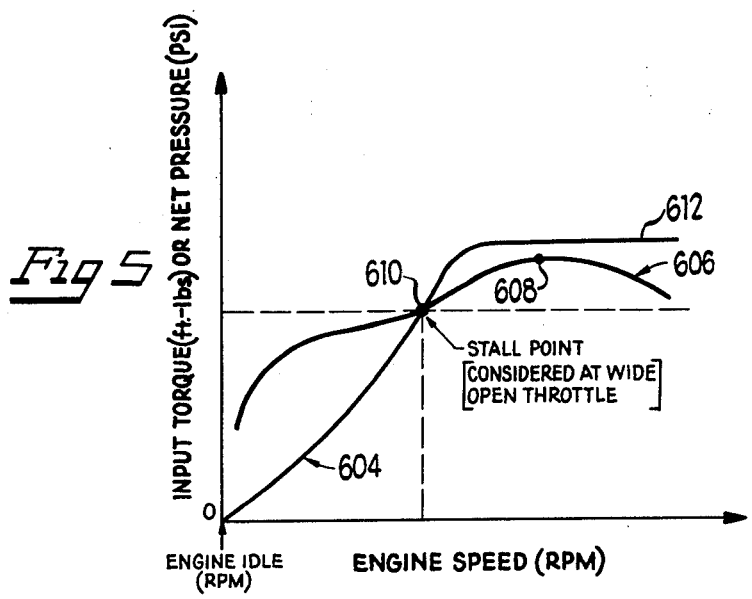
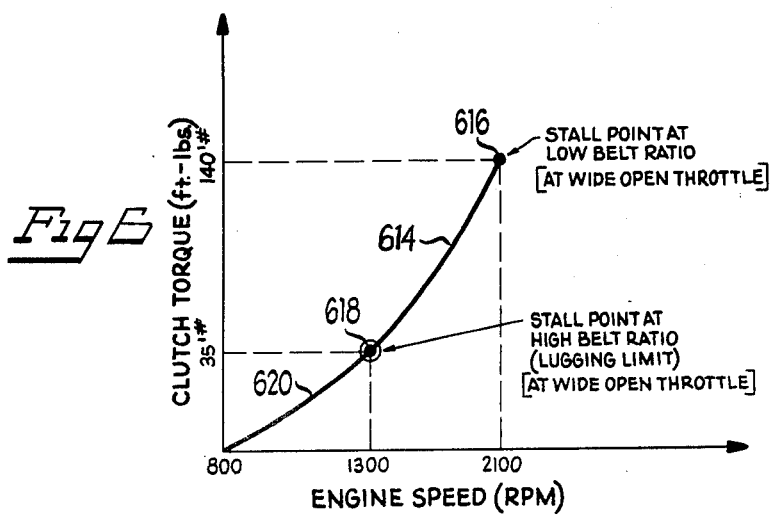

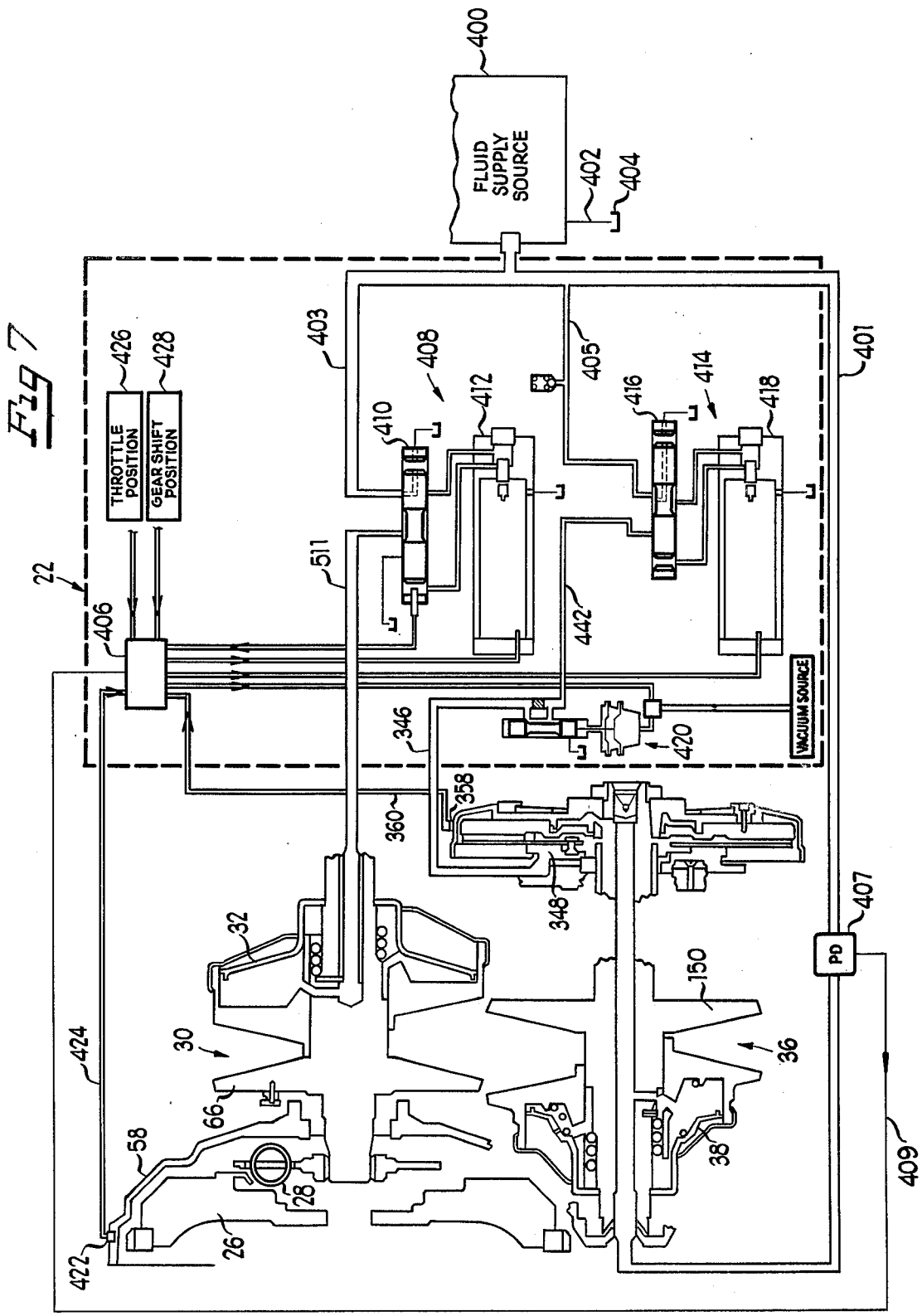

(CONTROL SYSTEM 700)

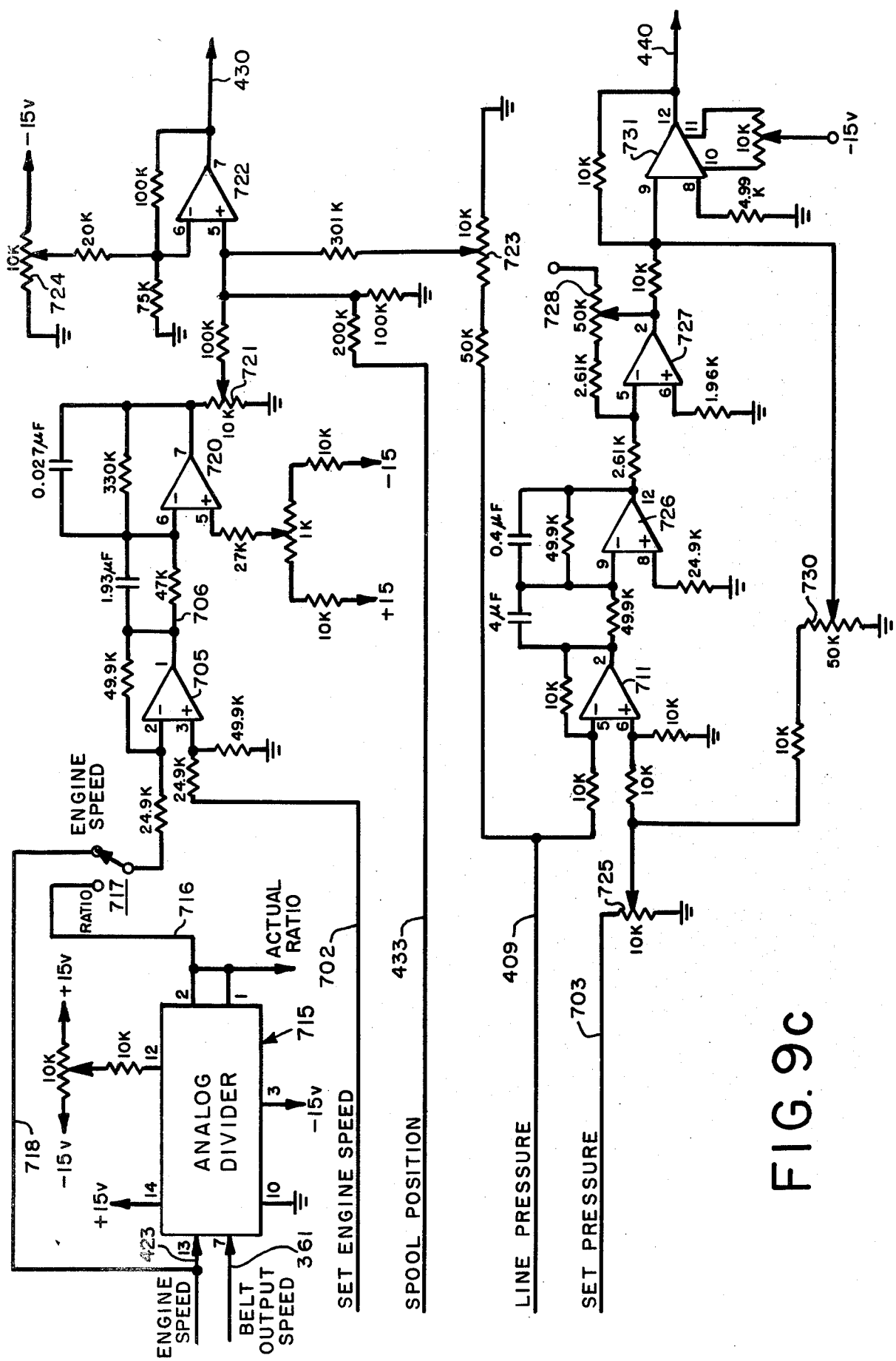

CONTROL ARRANGEMENT FOR A VARIABLE PULLEY TRANSMISSION

BACKGROUND OF THE INVENTION

Variable pulley transmission assemblies known in the prior art comprise variable sheave pulleys, a connecting belt and a control unit. In automotive applications it has generally been necessary to utilize hydrodynamic and-/or clutch assemblies as starting devices, and some arrangement to effect a change of direction. One suitable arrangement is a forward-reverse gear mechanism having planetary gearing and separate clutches. Planetary gearing also provides a desirable gear reduction. Alternatively, a change of direction can be accomplished with a reversal of the pulley rotation. This method of directional change, assuming low belt ratio, requires stopping pulley rotation and initiating motion of the drive train members in an opposite direction. Further, a change of belt ratio when the pulleys are stopped requires that the belt be slid across the pulley faces causing wear on both the belt and the pulley surfaces, and requires a great deal of force to perform such a belt movement.

A significant improvement in variable pulley transmissions is described in the application of Richard L. Smirl entitled "Variable Pulley Transmission", Ser. No. 257,283, filed Apr. 24, 1981, and assigned to the assignee of this application. As there taught a variable pulley transmission assembly is coupled between a prime mover and a driven means. The assembly includes, in order, from the prime mover, a vibration damper, input and output movable sheave pulleys connected by a flexible belt, a belt ratio control arrangement, a wet clutch, a forward-neutral-reverse gear arrangement and connecting elements to a drive means, generally a differential drive system with ring and pinion gear set. This apparatus is adaptable for use with an automobile where the engine is the prime mover and the final drive means is a differential-axle-wheel assembly.

In that application, a primary variable sheave pulley is mounted on an input drive shaft to which a vibration damper is drivingly connected, and which damper is affixed to a flywheel. A secondary variable sheave pulley is mounted on a second shaft, and connected to the primary pulley by a flexible belt such that the pulleys are continuously rotating during engine operation. In that application the secondary pulley is connected through a sleeve to a slippable, fluid actuated starting clutch, generally referred to as a wet or oil-cooled clutch. The starting device is responsive to prime mover speed. Also included in this starting device is a forward-neutral-reverse selector mechanism. Such an arrangement provides a continuously variable pulley transmission mechanism (CVT) where the pulleys are in continuous rotation during prime mover operation, which rotation provides ease of belt ratio shift even at a stopped or idle position of the driven means. However, control arrangements in the prior art are not suitable for optimum regulation of such a CVT, and it is thus a primary consideration of this invention to provide such an improved control arrangement.

SUMMARY OF THE INVENTION

The control arrangement of the invention is particularly useful with a CVT having an input shaft for receiving drive from a prime mover. The CVT has an input or primary pulley, an output or secondary pulley, and a belt extending between the pulleys to transfer power. Each of the input and output pulleys has a fixed sheave and a movable sheave which is operable to vary the distance between the pulley sheaves. A fluid actuated, slippable starting clutch is mounted on a second shaft, coaxial with the driven or output pulley. A forward-neutral-reverse gear selector is mounted along the second shaft and a countershaft. The starting clutch, when engaged, provides a driving connection between the second shaft and the forward-reverse gear means, so that the belt and the pulleys of the CVT continuously rotate in the same direction, no matter which direction of drive (forward or reverse) is selected.

The control arrangement of this invention regulates the fluid flow and pressure in the CVT system, to thereby govern the sheave diameters of the pulleys and the operation of the slippable starting clutch. In one embodiment the control system comprised a conventional computer, such as a microprocessor, coupled in series with a control system. Information signals provided to the computer included the engine output speed, transmission (or belt) output speed, throttle position, and gearshift (drive mode selector) position. From this information the computer sets desired values for the engine speed, CVT system pressure, and clutch cooling (on or off). The control system uses these "set" signals, with additional information from the CVT fluid system, to regulate (1) the CVT ratio (thus governing engine speed), (2) line pressure in the CVT fluid system (to maintain the requisite belt tension), and (3) the on-off state of the fluid cooling for the clutch.

THE DRAWINGS

In the several figures of the drawings, like reference numerals identify like components, and in those drawings:

FIG. 1 is a diagrammatic view of a variable pulley transmission system as taught in the copending application;

FIG. 3 is an enlarged showing of the slippable starting clutch in the CVT system of FIG. 1;

FIGS. 4–6 are graphical illustrations useful in understanding operation of the slippable clutch;

FIG. 7 is a schematic layout of a CVT as taught in the copening application with the electronic and hydraulic control arrangement of this invention;

FIG. 9C is a schematic diagram, of the electronic portion of the inventive control system.

BACKGROUND DESCRIPTION

Figure 2A:
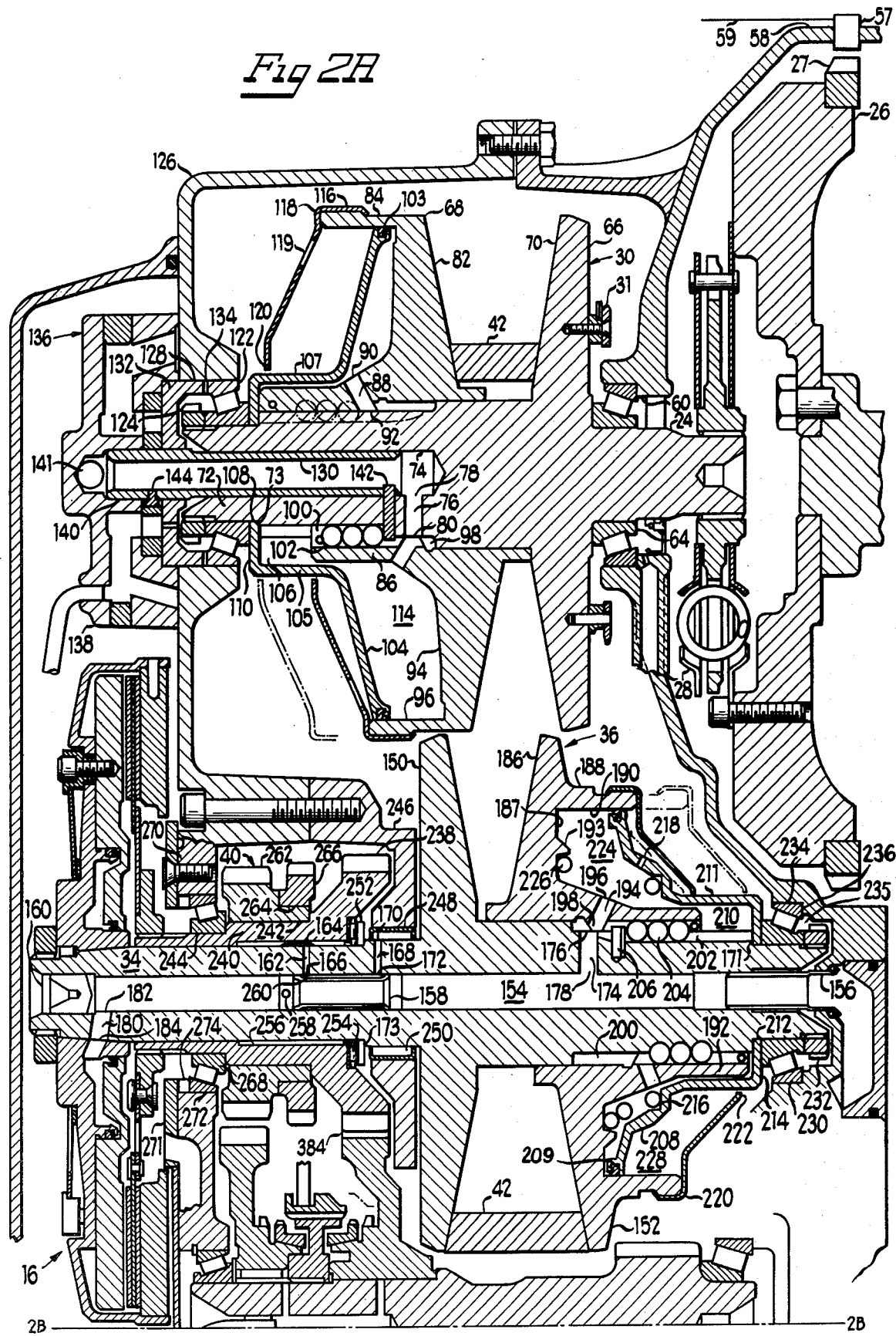
FIGS. 2A and 2B are detailed illustrations of the transmission assembly shown more generally in FIG. 1.

Before discussing the present invention, a background description of the CVT described in the copending application will be set out in connection with FIGS. 1, 2A, 2B and 3 of this application. FIG. 1 shows an assembly of a transmission mechanism 10 in a drive train connected to a prime mover 12, noted as an engine. The assembly 10 has four horizontal and parallel axes lettered A, B, C and D. The assembly includes a continuously variable pulley transmission (CVT) 14, connected between axes A and B, a slippable starting clutch 16 on axis B, a forward-reverse gear means 18 on axes B and C, and a final drive assembly 20 along axis D.

A transmission control arrangement 22 is shown along axis A.

The power train elements in FIG. 1 distributed along axis A from the prime mover 12 are a first shaft 24, coaxial with axis A, on which shaft 24 is. A torsional vibration damper 28 is drivingly connected and which damper 28 is affixed to a flywheel 26 connectible to the prime mover 12. Also mounted on shaft 24 is an input variable driver pulley assembly 30 which includes a fixed sheave 66 and a movable sheave actuator 32, and the transmission control means 22.

Affixed to and operable with fixed sheave 66 is a sprocket 31. A fluid pump 33, which is illustrated as offset from the axes A through D, has a shaft 39 on which there is affixed a second sprocket 35 which is drivingly connected by a linking means 37 to sprocket 31. Fluid pump 33 is continuously driven by shaft 39 during engine operation to supply fluid at line pressure through conduit means not shown.

Mounted along axis A, between pulley 30 and control means 22, and driven by shaft 24 is a lubricating pump 136.

Coaxial with second axis B is a driven shaft 34. Mounted on the shaft 34 is an output variable driven pulley assembly 36 which includes a movable sheave actuator 38, cluster driver gears 40 of the forward-reverse gear means 18, and the slippable starting clutch 16, which is fluid-actuated and controlled by control means 22. Input pulley 30 and output pulley 36 are connected by a belt means 42.

Axis C is coaxial with a countershaft 43 on which are mounted cluster driven gears 44 of the forward-reverse gear means 18. Driven gears 44 are in continuous engagement with driver gears 40 on shaft 34. Operative between the forward and reverse driven gears 44 and splined on countershaft 43 is a synchronizer 46 which is slidably connected to a gear shift rail 47 to selectively engage either the forward or reverse gear of driven gears 44. Splined to and driven by shaft 43 is a pinion gear 48. A differential assembly 50 of final drive assembly 20 defines a flange 52 on which is mounted a ring gear 54. Ring gear 54 is continuously engaged with pinion gear 48. Mounted and operative between cluster driver gears 40 and driven gears 44 is a reverse idler gear 41, as known in the prior art.

The final drive assembly 20 is coaxially mounted along axis D and includes a drive axle 56. Differential assembly 50 is connected to the drive axle 56 in a manner known in the prior art.

Referring now to FIG. 2A, a vibration damper 28 is shown mounted on shaft 24 and connected to flywheel 26 with gear teeth 27 and this two element combination of vibration damper and flywheel is protectively covered by a housing 58. Mounted in housing 58 above the teeth 27 of flywheel 26 is a magnetostrictive device 57 of a type known in the prior art to produce an electronic signal which is communicated to control arrangement 22 by conductor means 59. This signal is calibratable through control means 22 as a measure of input speed. Housing 58 defines a bore 60. Shaft 24 with a bearing assembly 64 mounted thereon extends through bore 60 to retain bearing 64 therein. Driver pulley assembly 30 is mounted on shaft 24 internal to housing 58 and downstream from bearing 64.

Driver pulley assembly 30 includes a fixed sheave 66 and a movable sheave 68. Fixed sheave 66 defines an inner sloped face 70 and in cooperation with shaft 24 also defines a sleeve 72 with a shoulder 73, a fluid conduit 74 and a passage 76 with ports 78 and 80. Movable sheave 68 defines an inner sloped face 82, an extended arm 84, a sleeve 86, fluid passage 88 with ports 90,92, an inner chamber face 94, and an inner chamber surface 96 of arm 84. Sleeve 86 and sleeve 72 cooperate to define annular fluid chamber 98, and a ball track 100 wherein ball bearings 102 are positioned to thereby ball-spline sleeve 86 about sleeve 72. An annular piston flange 104 with a wall 105 is formed to define a recess 106, a bore 108 and a brace wall 110. The bore 108 and wall 110 are slidably pressed onto shaft 24 against shoulder 73. Recess 106 with a shoulder 107 can receive sleeve 86 and has wall 110 to bear a thrust load. Flange 104 with a lip seal 103 sealingly contacts inner chamber surface 96 of arm 84, and surface 96 cooperates with inner chamber face 94 and sleeve 86 to define a fluid volume chamber 114 which communicates to fluid conduit 74 through ports 78,80,90 and 92, passages 76 and 88 and fluid chamber 98. A flange cap 116 has a wall 118 conforming generally to the shape of piston flange 104 without contacting flange 104. Cap 116 is affixed to arm 84 and is movable with movable sheave 68. Wall 118 defines a bore 120 that is slidable along shoulder 107 of recess 106 but does not bear on shoulder 107.

Wall 118 defines a fluid vent hole 119 to allow fluid leakage to evacuate during pulley 30 rotation from the gap between piston flange 104 and cap flange 116.

An annular bearing assembly 122 is pressed on sleeve 72 against wall 110 and secured in that position by a lock nut 124 affixed to shaft 24; both bearing 122 and lock nut 124 are known in the prior art. A housing 126 defines a bore 128 to receive and retain bearing assembly 122. Housing 126 is secured by means 127 known in the art to housing 58. A tubular insert 130 is positioned in fluid conduit 74 and extends through bearing 122 and lock nut 124 and has mounted about this extended portion a seal 132 having walls 134 pressed into bore 128 to abut bearing 122 without disturbing lock nut 124.

A gerotor pump 136 for lubrication only, such as those manufactured by Nichols Corporation, has a cover 138 defining a recess 140 to receive the tubular insert 130. There is a cross-drilled hole 141 defined by cover 138 that allows communication from an external source to the conduit 74 through tubular insert 130. The pump 136 is affixed to housing 126 by means known in the art. Tubular insert 130 is held by locking pins 142,144 secured to sleeve 72 and pump 136, respectively.

Belt means 42 connects driver pulley assembly 30 with driven pulley assembly 36, which driven pulley 36 is mounted on shaft 34 that is coaxial with axis B. Belt means 42 is known in the prior art.

Pulley assembly 36 has a fixed sheave 150 and a movable sheave 152 which is movable in an axial direction along shaft 34. Shaft 34 defines a through-hole fluid conduit 154 extending longitudinally through shaft 34. This conduit 154 has been reamed at both ends and receives a fluid source connectible insert 156 communicable to a fluid source at one end, and a lubricating insert 158, known in the art, and an end-plug 160 at the opposite end. Shaft 34 defines lubricating passage 162 with ports 164,166 and a second lubricating passage 168 with ports 170,172 which passages and ports communicate with lubricating insert 158. Shaft 34 defines shoulders 171 and 173, a fluid passage 174 with ports 176 and 178 and a second fluid passage 180 with ports 182 and 184, in proximity to clutch 16.

Movable sheave 152 includes an exterior sloped face 186 and an interior wall 187, an extended rim 188 with a contact surface 190, a sleeve 192, and a rib 193 protruding from wall 187. Sleeve 192 defines a fluid passage 194 and communicating ports 196,198 therewith. Sleeve 192 cooperates with shaft 34 to define an annular fluid chamber 200 which communicates between passages 174 and 194. Sleeve 192 and shaft 34 also cooperate to define a ball track 202 therebetween, in which are positioned ball bearings 204 to thereby ball spline movable sheave 152 to shaft 34. A pin 206 is fitted into shaft 34 extending into track 202 in proximity with passage 174 to serve as a positive stop for bearings 204. An annular piston flange 208 with lip seal 209, similar to flange 104 of input pulley 30, is formed about shaft 34. Flange 208 defines a recess 210, a surface 211, a bore 212 and a wall 214. Flange 208 sealingly contacts extended rim 188 along surface 190. Flange 208 defines a shoulder 216 and an orifice 218 of about forty-five thousandths (0.045) inch diameter which orifice 218 can have a "Wiggle Wire" inserted therein to maintain flow but which is not here shown. Affixed to rim 188 at movable sheave 152 is a balance flange cap 220 that is formed in a fashion similar to flange cap 116 at driver pulley 30. Flange cap 220 defines a bore 222 about surface 211 and travels with movable sheave 152 along said surface 211 without contacting it.

Movable sheave 152 and piston flange 208 cooperate to define annular fluid chamber 224 that communicates with fluid conduit 154 through passages 174,194 and chamber 198. A coil bias spring 226 is retained in chamber 224 against rib 193 of sheave 152 and shoulder 216 of flange 208. Spring 226 biases movable sheave 152 in the direction of fixed sheave 150. Flange 208 and flange cap 220 cooperate to define a fluid pressure balancing cavity 228 which communicates with chamber 224 through orifice 218. Piston flange wall 214 is secured against shoulder 171 of shaft 34 by a bearing assembly 230 which is secured in position on shaft 34 by a lock nut 232 affixed on shaft 34. Housing 58 defines a bore 234 and shoulder 236 to seat and retain bearing 230, and also defines a recess 235 to enclose lock nut 232.

Mounted at the opposite longitudinal end of shaft 34 from bearing 230 is clutch 16. Mounted on shaft 34 between clutch 16 and fixed sheave 150 of pulley assembly 36 are the cluster driver gears 40 of forward-reverse gear means 18. Driver gears 40 include a forward gear 238 which defines a sleeve 240 with lands 242 and 244. Gear 238 is mounted on and rotatable about shaft 34 and is in proximity to but separated from fixed sheave 150 by a flange 246 defined by housing 126. Flange 246 defines bore 248 in which is seated and retained a bearing assembly 250 mounted on shaft 34 to maintain flange 246 concentric about shaft 34. Abutting shoulder 173 of shaft 34 is an annular stop ring 252 against which is mounted a bearing assembly 254. Sleeve 240 is mounted about a bearing 256 positioned on shaft 34 and abuts bearing 254. Shaft 34 defines a fluid entry hole 258 which communicates to the outer diameter of shaft 34. Insert 158 defines a passage 260 which can pick up and communicate a measured volume of fluid. This insert 158 transports lubricant to bearing 250, 254 from bearing 256 through passages 162 and 168, respectively.

Cluster driver gears 40 have a reverse gear 262 affixed to and rotating with land 242 of sleeve 240. Reverse gear 262 defines a shoulder 264 on which is affixed a sprag gear 266 for the parking mode of the transmission assembly 10. Cluster driver gears 40 can also be a single assembly. Mounted on land 244 of sleeve 240 is a retaining bearing 268 which is held in position by a flange 270 defined by housing 126, which flange defines a bore 272 to seat bearing 268 against an annular stop 271 and a spacer 274. Stop 271 is secured to flange 270 by means known in the art.

Figure 2B:
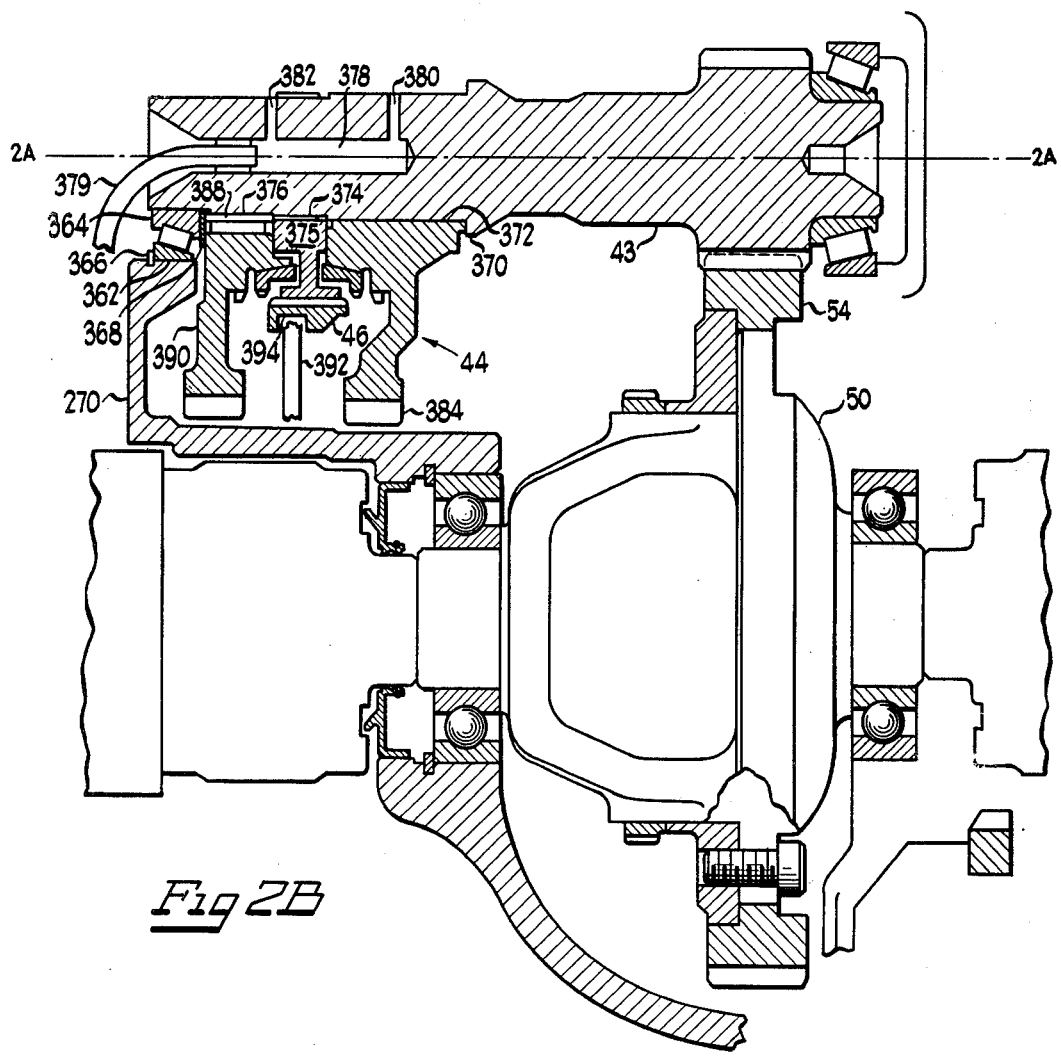

FIG. 2B shows driven gear means 44 of forward-reverse gear means 18 of FIG. 1, includes a forward gear 384 and a reverse gear 390, with bearing means on countershaft 43 which is coaxial with axis C. Flange 270 defines a bore 362 for seating a bearing assembly 364 which is secured in position by a snap ring 366 set in an undercut in flange 270. A thrust plate 368 is mounted on countershaft 43 on the opposite side of bearing assembly 364 from snap ring 366 and these elements are retained on the end of shaft 43 against driven gears 44.

Countershaft 43 defines a thrust shoulder 370, land 372, spline 374 and land 376 each shown with a smaller cross-section on shaft 43 than the previously mentioned cross-section. A toothed ring 375 is splined to shaft 43 at spline 374 and synchronizer 46 is slidably mounted thereon. Shaft 43 also defines a blind-drilled lubricating conduit 378 along its longitudinal axis and, fluid lubricating passages 380 and 382 which communicate between conduit 378 and lands 372 and 376, respectively, at the surface of shaft 43. Lubricating fluid can be communicated to conduit 378 through a conduit means 379 mounted in the end of conduit 378 and connectible to lubricating pump 136, shown in FIG. 2A. Journalled on land 372 of shaft 43 and abutting shoulder 370 is forward gear 384 of driven gears 44. This forward gear is freely rotatable about countershaft 43 and is in continuous engagement with driver forward gear 238 on shaft 34. Pressed on land 376 of shaft 43 is a bearing assembly 388 on which is mounted reverse gear 390 of driven gear means 44. This gear 390 is freely rotatable about countershaft 43 and continuously engaged with reverse idler gear 41 of FIG. 1 of driver gear means 40 as known in the art. Slidably mounted on toothed ring 375 is synchronizer 46 that defines an annular groove and which synchronizer 46 is slidably engageable with either forward gear 384 or reverse gear 390. Synchronizer 46 also has a neutral position between these forward and reverse gears 384, 390 and is slidable by a gear selection fork 392 positioned in shoulder groove 394. Synchronizer 46, at engagement with either forward or reverse gears, transfers power through countershaft 43 to ring gear 54 mounted on the differential assembly 50 of the final drive assembly 20. Power is transferred to an axle or wheel arrangement as known in the prior art as and illustrated in FIG. 1.

Clutch assembly 16 is shown in FIG. 3 in an enlarged view and includes a cup-shaped cover plate 300, a pressure plate 302, a reaction plate 304, a clutch disc assembly 306, a Belleville spring 308 and connecting elements. Clutch 16 is mounted on shaft 34 where cover plate 300 defines a hub 310 and a tapered bore 312. Clutch 16 is fitted onto shaft 34 and positioned by a dowel pin 314 and secured at hub 310 by a locknut 316, which abuts hub 310 and is screwably affixed to shaft 34. Cover plate 300 defines a front face 318, a perimeter wall 320, a series of connecting-means portals 322 on its front face 318, and a plurality of vent holes 324 equispaced on perimeter wall 320. Hub 310 defines a conduit 326 and ports 328, 330. Cover plate 300 and pressure plate 302 cooperate to define an annular clutch fluid pressure chamber 332 which communicates with conduit 154 through passage 180 and conduit 326.

Reaction plate 304 is affixed to cover plate 300 by a securing means 334 illustrated as a pin or dowel; this reaction plate 304 has a backface 305. Plate 304 can be secured by any means known in the art. Clutch disc assembly 306 includes a clutch disc 336 with large oil grooves for fluid transfer (not shown), an annular ring 342 and a spline member 344. Clutch disc 336 has an energy-absorbing layer (not shown) and a friction material layer (338 and 340) mounted on each of its faces. This composite arrangement is positioned between and engageable by pressure plate 302 and reaction plate 304. Disc 336 is drivingly affixed to the outer perimeter of annular ring 342 and this combination is secured to the spline member 344 at the inner diameter of annular ring 342, which spline member 344 is splined to sleeve 240 of forward gear 238.

Clutch 16 is fluid actuated and cooled. Coolant is provided through a fluid conduit 346 connected to a fluid source (not shown). Plate 304, annular ring 342 and plate 271 define an open cavity 348.

A thin metal annular sheet 347 affixed to plate 271 is in a plane parallel to face 305 of driven plate 304 of clutch 16. Flange 270 and metal plate 347 define a wide passage 349 which communicates with conduit 346. Plate 271 defines a large port 276 which communicates between passage 349 and cavity 348. Reaction plate 304 defines a shoulder 350 to retain the cooling fluid in clutch cavity 348 during rotational motion of the clutch. Clutch disc assembly 306 and pressure plate 302 cooperate to define an irregularly shaped annular cavity 352 in clutch 16 which cavity 352 communicates with vent holes 324 of cover plate 300. Annular ring 342 defines a series of communicating ports 354 to communicate coolant fluid from cavity 348 to cavity 352 and thereafter past both faces of clutch plate 336 and thus to provide coolant fluid emission through vent holes 324 during rotation of the clutch 16.

Pressure plate 302 is connected to zero rate Belleville spring 308 (as explained in U.S. Pat. No. 3,951,393) by connecting means 356 through portals 322, and plate 302 is biased by spring 308 to a disengaged condition as illustrated in FIG. 3. Pressure plate 302 is fluid actuated by fluid pressure in chamber 332 adequate to overcome the force of Belleville spring 308 and to thrust pressure plate 302 in an axial direction into contact with clutch disc assembly 306 and, therethrough into driving communication with reaction plate 304 through friction faces 338, 340.

Mounted in proximity to vent holes 324 is a magnetostrictive device 358, although any similar transducer signal generator would do, that monitors a magnetic field effect change induced by the change in plate mass as each vent hole 324 passes it. This device 358 is known in the prior art and produces a signal that can be calibrated through control arrangement 22 to indicate pulley 36 output speed.

Operation of the mechanical components shown in FIGS. 1-3 is as follows. Transmission 10 includes a slippable starting clutch 16 that is fluid cooled and fluid pressure actuated. The variable pulley system 14 of mechanism 10 is likewise fluid operated. At prime mover 12 start-up, the continuously variable pulley transmission (CVT) 14 has its belt 42 at its bottom travel or low belt gear ratio in driver pulley assembly 14. Rotational velocity is transmitted to driver pulley assembly 30 by shaft 24 and thereafter through belt 42 to driven pulley assembly 36. Driven pulley assembly 36 continuously drives shaft 34, which is affixed to fixed pulley sheave 150, and to clutch cover plate 300 at the hub 310 with locking nut 316.

Clutch 16 engagement provides a driving connection to synchronized forward-reverse directional gear means 18 from pulley system 14. The use of gear means 18 obviates the necessity to change belt direction to provide a change of direction to the final drive member 20.

Driving power from clutch 16 is provided to the driver gears 40 of forward-reverse gear means 18 through sleeve 240 which is sleevably mounted on and rotatable about shaft 34. Forward gear 238 is affixed to sleeve 240 and is continuously engaged to forward gear 386 of the driven gears 44 of gear means 18, which driven gears 44 are mounted on and freely rotatable about countershaft 43. Drivingly mounted on sleeve 240 is a reverse gear 262 of driver gears 40 of gear means 18 which, in conjunction with an idler gear 41, continuously engages reverse gear 390 of driven gears 44 of gear means 18 which is bearing-mounted on countershaft 43 and forms a reverse gear arrangement known in the prior art. Mounted on land 264 of reverse gear 262 on shaft 34 is a parking sprag 266 which is engageable at the stopped or park position, and such gear engagement is well known in the prior art. Positioned between and slidably engageable with either the forward or reverse gears of driver gears 44 on countershaft 43 is a synchronizer 46 splined to ring 375 and operable by shifting fork 392. At synchronizer 46 engagement, as drive is being provided through engaged clutch 16, power is transmitted to the final drive assembly 20 in either a forward or reverse direction.

At transmission idle the prime mover 12 is driving input pulley 30 through a flywheel 26, vibration damper 28, and drive shaft 24. In FIG. 2A, the upper halves of pulleys 30 and 36 are shown in low belt ratio (i.e., driver pulley 30 almost at maximum gap opening and belt 42 at closest radius to drive shaft 24). Pulley 30 is utilized to control the belt position or ratio and not belt tension or output torque of the drive train. The change of width between fixed sheave 66 and movable sheave 68 of pulley 30 provides the change in belt ratio in response to the transmission control means 22. This ratio control in the case shown in FIG. 2A, is provided for by an introduction of a fluid to sealed chamber 114, such as from a fluid supply means communicating with fluid passage 74 through insert 130 therein to port 76, chamber 98 and port 88. A change in fluid volume into chamber 114 will proportionally move sheave 68 to reduce the sheave gap. As belt 42 travels from the inner radius of pulley 30 to the outer radius, the transmission belt ratio changes from low to high with a range of about 5.4 to 1.

Pump 136 is affixed to shaft 24 and only provides lubricant to the various wearing parts of the transmission at a relatively low pressure, that is in the range of about 20 psi. Control fluid for chamber 114 passes through a counter-drilled hole 141 of pump 136 in the face of cover 138 and thus to fluid passage 74.

Output driven pulley 36 is also fluid operated. However, as driver pulley 30 sheave gap decreases the driven pulley 36 sheave gap increases, and in FIG. 2A this implies that belt 42 moves from the outer radius to the inner radius of pulley 36. The sheave gap of the driven pulley 36 is determined by the position of movable sheave 68 of driver pulley 30 through belt 42. Control fluid, at a line pressure controlled by control arrangement 22, is freely communicated to control fluid cavity 224 of driven pulley 36 through insert 156, through-hole conduit 154, passage 174, chamber 200 and passage 194. Both the volume of cavity 224 and the piston area of movable sheave 152 within that volume are noticeably smaller than their counterparts of driver pulley 30. Control fluid in cavity 224 is communicated to fluid pressure balancing cavity 228 through orifice 218 in piston flange 208. Fluid is transferred to cavity 228 to balance the centrifugal component of the total pressure on either side of flange 208 thereby avoiding a centrifugal thrust on sheave 152. The movable sheave 152 has a bias spring 226 acting on it and biasing the sheave to minimize the sheave gap width.

The through-hole conduit 154 provides a transfer means for control fluid for slippable starting clutch 16, which is engaged through fluid pressure in cavity 332 (FIG. 3). The force of the Belleville spring 308 of clutch 16 tends to maintain pressure plate 302 in the non-contacting or open position. When the fluid pressure in cavity 332 is sufficient, pressure plate 302 is pressed into contact with friction facing 340 to engage driven plate 304 against the Belleville spring 308 force. Coolant fluid is supplied through control means 22 and conduit 346 to cooling fluid cavity chamber 348 of clutch 16. At clutch engagement pressure plate 302 contacts friction facing 340 to drivingly engage driven plate 304 through disc 336, and spline member 344, which is splined on hollow sleeve 240 of gear 238, is driven by annular ring 342 and disc 336. Thereafter, rotational motion is communicated to forward gear 238 and reverse gear 262, which gears are rigidly connected, through which shaft 34 extends, and about which shaft 34 forward-reverse gears 238, 262 are freely rotatable. Forward or reverse drive direction, or neutral, if desired, is selectable by operation of synchronizer 46. The synchronizer 46 position is slidably operable by the fork 392 and rail 47, as known in the prior art. The forward, reverse gears 384, 390 on countershaft 43 are in constant engagement with mating forward gear 238, on shaft 340 and idler 41. At synchronizer 46 engagement rotational motion is transferred to the final drive assembly 20, which assembly includes elements such as a differential 50 and axle means 56 as known in the prior art.

In the operation of this transmission mechanism the pulley system 14 is in constant unidirectional rotary motion whenever prime mover 12 is operating. All power to the final drive assembly 20 must be communicated from the pulley system 14 through the slippable starting clutch 16, and the forward-reverse gear means 18. In this arrangement, the control arrangement 22 regulates fluid line pressure in passage 154 and fluid volume in chamber 114 based on engine output speed, transmission output speed, throttle position, and gear shift lever position. The pulley system 14 is controlled and biased such that it will return to the low belt ratio position whenever the speed signals indicate, through control means 22, a stopped or idle condition. At a given throttle opening for an engine 12 coupled to transmission assembly 10 of a vehicle with a speed-responsive clutch starting means, it is known that the engine revolutions per minute (RPM) will accelerate that vehicle up to a speed after a certain time period. If engine RPM is plotted as a function of miles per hour (MPH) against vehicle speed on x-y coordinate axes, there is a specific engine RPM (at that given throttle opening) that will intersect the RPM/MPH function at a given MPH, and at that point the clutch is at end of slip. From a stopped vehicle condition until that RPM is reached, which corresponds to the RPM/MPH point of intersection, there is clutch slip. Thereafter the speed of the vehicle and engine RPM increase without clutch slip, or until a different throttle opening is selected.

Where torque is plotted as a function of engine RPM, the resultant function is a parabolic curve similar to that for a hydrokinetic device or a centrifugal clutch, and increases from the origin of an x-y coordinate axes plot, where the origin represents idle speed. At any point along this parabolic curve, for a given engine RPM there is an associated given torque output value, and this point is termed the "stall point". Physically this corresponds to a vehicle that is not moving, with the engine operating and the clutch is in the slipping mode engaged, and at that time the clutch is slipping with as much torque as is available at wide open throttle; that is the "stall point". In a known CVT using a centrifugal clutch and/or a fluid coupling beyond this "stall point" on the clutch torque versus RPM curve any further slip is absorbed through the belt. In the present a relief means (throttle position) in control arrangement 22 allows an incremental limited, i.e. drive torque slip beyond the "stall point", and after that added input torque limited slip, clutch 16 again slips to absorb the added torque. The torque herein is proportional to the fluid pressure which is operating clutch 16 and output pulley 36 beyond the starting mode. More accurately the torque on the clutch 16 is proportional to the line pressure in fluid conduit 154 minus the force of spring 226. This clutch 16 slip condition for excess torque is present in the lower belt ratios, and such slip is also available if the fluid line pressure is inadvertently reduced. Such slipping of clutch 16 provides a means to protect pulley system 14 from incurring slip and reduces belt 42 loading that would otherwise tend to fatigue the belt.

Clutch 16 is a liquid cooled (wet) starting clutch which is slippable in the low belt ratio as torque is provided to the final drive assembly 20 after clutch lock-up, that is, at 1:1 ratio. At clutch 16 disengagement the fluid pressure in cavity 332 is removed and the Belleville spring 308 acts to retract pressure plate 302 to the disengaged position. This reaction is almost instantaneous, that is, on the order of one-tenth (0.1) second. Coolant fluid is not applied to clutch 16 until clutch actuation, which action protects against a power transfer through the drive train at idle through the clutch and fluid, which is known as "creep".

FIG. 4 shows the variation of clutch driven plate speed as a function of vehicle speed on a curve 600. As shown there is a corresponding vehicle speed (in miles per hour or MPH) for each particular engine speed (in revolutions per minute or RPM). Curve 600 shown indicates that after a given time, vehicle speed and clutch speed intersect at a point 602. At that point, the starting clutch is at the end of its slip, and for a given throttle opening, point 602 also represents the "stall point". From the origin until the end of clutch slip, the angular speed of clutch reaction plate 304 rises proportionally with vehicle speed, and this rise is dependent upon gear ratio, not belt ratio. The pressure or driver plate 302 is rotating at a constant speed (at a given throttle opening) dependent upon the preprogrammed or constant speed engine output.

In FIG. 5, curve 604 is a parabolic function showing the variation of input clutch torque (in ft.-lbs.) or pressure (in psi) as a function of engine speed, where the abcissa commences at some value connoting engine idle speed, rather than from zero RPM which would represent a vehicle-stopped condition. A second general function 606 with a maximum value at point 608 is also shown. This second function 606 represents the net engine torque at wide open throttle as a function of engine speed. The intersection of curves 604 and 606, at point 610, indicates the stall point. The stall point signifies the amount of clutch torque before the pressure plate and reaction plate rotate at the same speed.

In the past, after engine speed increased above the stall point, the clutch input torque continued to increase parabolically as shown by curve 604. This was true both for mechanical clutch and hydraulic coupling devices such as a fluid coupling. This was also true for vehicles equipped with torque converters, if curve 604 is modified to depict starting from zero engine speed. However, as represented by curve segment 612, after a preprogrammed or preset increase in clutch torque above the stall point, the present arrangement again allows the clutch to slip in the low belt ratio range. This preprogrammed clutch operation allows the engine speed to increase further without imposing an additional load on the clutch; the clutch will thus track the engine speed in an almost linear manner, as depicted by curve segmet 612.

Curve 614 in FIG. 6 is generally similar to curve 604 in FIG. 5. Curve 614 will be used, in conjunction with representative values rounded off to whole numbers, for ease of comprehension, and these values do not limit the present invention. Curve 614 shows clutch torque plotted as a function of engine speed. In this example, wide open throttle is indicated at stall point 616, corresponding to 2100 RPM and a clutch torque load of 70 ft.-lbs. At this 2100 RPM engine speed, if the transmission is at a 1:2 underdrive ratio, at point 616, at this low belt ratio there is effectively a 140 ft.-lbs. clutch torque. However, the clutch torque for a 2:1 overdrive ratio, at this same stall point 616, is effectively 35 ft.-lbs. clutch torque. In this example, the engine RPM for the 35 ft.-lbs. clutch torque on the curve is denoted at point 618, corresponding to 1100 RPM, which becomes the new stall point, and at this high belt ratio of 2:1, point 618 also represents the lugging limit.

Therefore, the lugging limit can be preset by either (1) the clutch fluid-actuating pressure, with a known Belleville spring force, and/or (2) the value of a variable in a program for a computer, wherein the spring force is represented as a constant. Once the preset lugging limit is known, the clutch can be preset to again slip below this lugging limit and thereby avoid "torsionals", that is, translation of severe engine vibrations through this slipping clutch to the drive wheels. Below this preset lugging limit, at a preset engine RPM the belt ratio can automatically be transferred to a lower ratio, and the engine RPM will then increase to match this new belt ratio without allowing torsionals past the clutch. The shape of the low RPM range 620 of curve 614 can be altered by adjusting the force provided by the retractor spring.

DETAILED DESCRIPTION OF THE INVENTION

FIG. 7 illustrates a CVT and power train as already described, and the control arrangement 22 of this invention is shown within the dashed lines. Control arrangement 22 governs operation of the CVT and slippable starting clutch, in response to measured data and stored functional information. Arrangement 22 is connected to a fluid supply source 400, such as a pump, which has a connection 402 to a sump 404. Fluid supply source 400 has an output connection to a main conduit 401 that communicates between fluid source 400 and fluid connecting insert 156 of output shaft 34. The valve assemblies 408 and 414 of the control arrangement are connected to conduit 401 by conduits 403 and 405, respectively, to communicate and control fluid between source 400 and the transmission assembly 10.

Control arrangement 22 includes an electronic signal integrator-generator (signal I-G) 406 operative to receive signals indicating: throttle position; gear shift (drive selector) position; transmission input speed; transmission output speed; control valve 410 spool position; and pressure in primary fluid line 401,403. In the control system, a first control valve assembly 408 includes a spool valve 410, and a FEMA valve or solenoid actuated fluid control valve 412, both of which are known in the prior art. A second control valve assembly 414 comprises a spool valve 416 and another FEMA valve 418. A vacuum operable subassembly 420 is provided to regulate coolant flow to the clutch.

A magnetostrictive sensor 422 is mounted on flywheel housing 58 to detect the passage of the flywheel gear teeth, providing an electronic signal on line 424 to control arrangement 406 for electronic processing to determine the desired input speed of prime mover 12. Throttle position and gear shift position signals are also provided to controller 406 by any manner known in the art, such as linear or rotary potentiometers. First control valve assembly 408 is operative to control fluid volume at line pressure from fluid supply source 400 to input pulley 30. Second control valve assembly 414 is operative to control fluid pressure to output pulley 36 and, through solenoid valve 420, to clutch assembly 16. An output speed signal is transmitted to controller 406 from sensor 358 through conducting line 360. Line 401 fluid pressure to clutch 16 and driven pulley 36 is monitored by a pressure transducer 407, which transmits an electrical signal to controller 406 through a conducting means 409.

Figure 8:
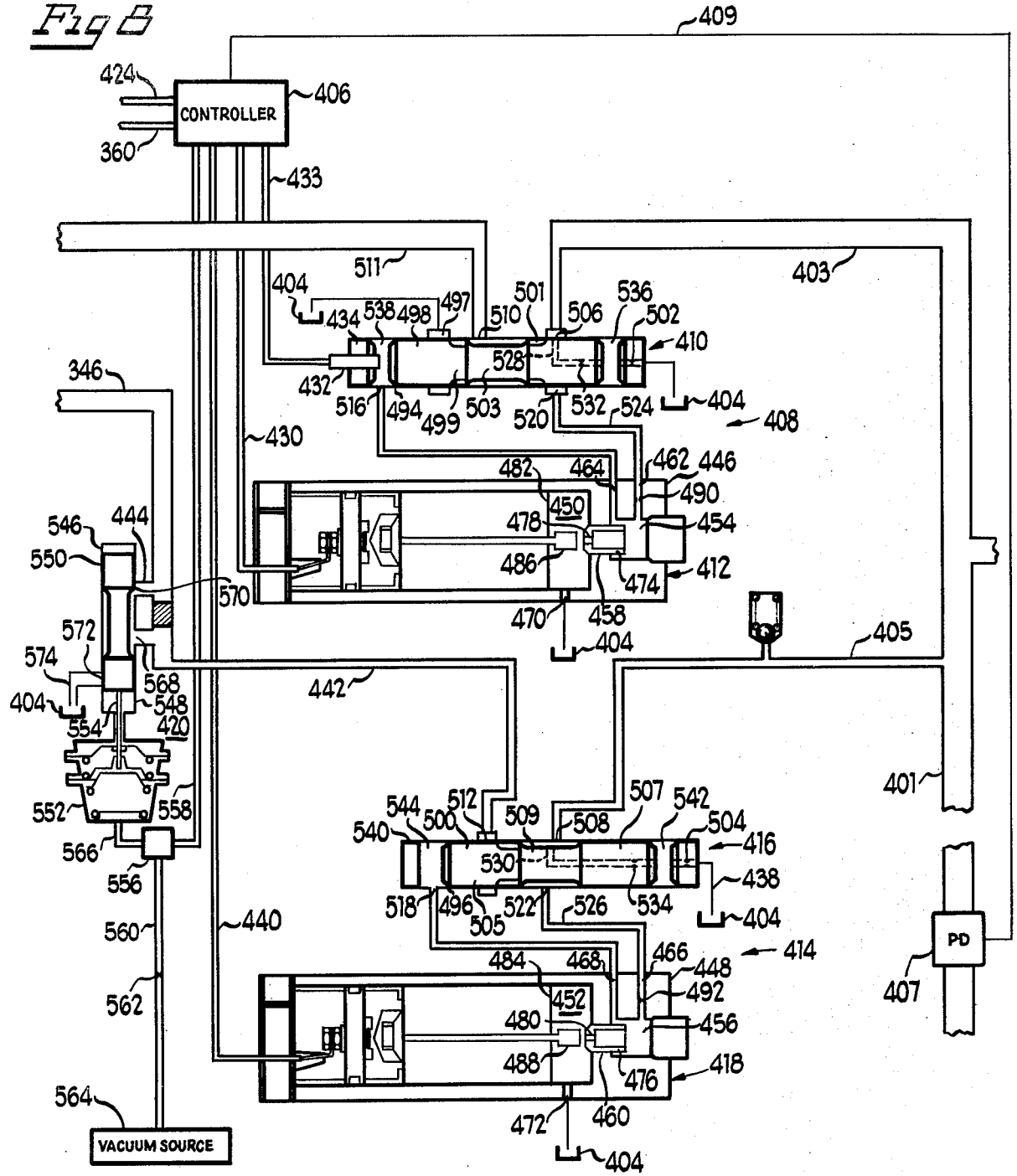
FIG. 8 is a schematic diagram of the hydraulic portion of the inventive control system.

FIG. 8 is an enlarged view of control arrangement 22. As there shown, control valve assembly 408 has a FEMA valve 412 regulated by a control signal from controller 406 over line 430. FEMA valve 412 operates to control the fluid pressure and flow through spool valve 410. In valve 410 a monitoring element, shown as a proximity probe 432, is affixed in an end wall 434 to provide a feedback signal over line 433 to controller 406; the signal identifies the position of the regulating spool in valve 410. Spool valve 410 and FEMA valve 412 of assembly 408 are both equipped to bypass fluid flow from source 400 to sump 404. Spool valve 410 is controlled by a pressure differential condition produced by FEMA valve 412 to allow a change in the volume flow through conduit 511 to chamber 114 of input pulley 30, thus to vary the sheave diameter and control the ratio of the CVT.

The second electromechanical control valve assembly 414 also includes a spool valve 416 and a FEMA valve 418. FEMA valve 418 is regulated by a control signal from controller 406 over line 440. Valve assembly 414 operates to control the fluid pressure through conduit 401 to output pulley 36 and clutch 16. Also, valve assembly 414 provides communication of coolant fluid to chamber 348 of clutch 16 through a conduit 442 communicating between spool valve 416 and solenoid valve 420.

The fluid signal pressure-control devices 412 and 418, in the illustrated embodiment, are FEMA valves known in the prior art, and they respond to an electrical control signal to provide a controlled fluid pressure. The FEMA valves both operate in a similar manner in response to the input signal and, therefore, they will be described together. FEMA valves 412 and 418 have valve housings 446 and 448, respectively, which define solenoid winding or coil chambers 450 and 452. Housings 446 and 448 define, respectively, fluid chambers 454 and 456; bores 458 and 460; fluid channels 462, 464, 466 and 468; and ports 470 and 472. Ports 470 and 472 communicate to sump 404. Inserted in bores 458 and 460 are, respectively, inserts 474 and 476 which define, respectively, ports 478 and 480 communicating between chambers 450 and 454, and 452 and 456, respectively. Mounted and operable in chambers 450 and 452 are, respectively, coils 482 and 484 with plungers 486 and 488 which are slidable in chambers 450 and 452 and in proximity to bores 458 and 460, respectively. The plungers 486, 488 are engageable with inserts 474, 476 to restrict flow through ports 478, 480, respectively. FEMA valve housings 446, 448 define orifices 490, 492 in channels 462, 466, respectively.

Assemblies 408 and 414 include spool valves 410, 416 having valve housings 494, 496 in which slidable spools 498, 500 are positioned. Slidable spool 498 defines lobes 499 and 501 and land 503, and spool 500 defines lobes 505 and 507, and land 509. The housings 494, 496, respectively, define the following: orifice ports 502, 504 individually connected to sump 404; fluid supply ports 506, 508 connected to fluid line 401 by conduits 403, 405; fluid output ports 510, 512 connectible through conduits 511, 442 to driver pulley 30 and slippable clutch 16 coolant chamber 348, respectively; pressure control fluid ports 516, 518 are connected to channels 464, 468, respectively, of FEMA valves 412, 418; and fluid transfer ports 520, 522 which communicate to channels 462, 466 through conduits 524, 526, respectively. Slidable spools 498 and 500 define, respectively, fluid bypass channels 528, 530 which in turn define orifices 532, 534, respectively, therein. Spool 498 cooperates with valve housing 494 to define a bypass chamber 536 communicable between orifices 502, 532; and this spool 498 housing 494 combination also defines a pressure control chamber 538 at the other end of the valve. Proximity probe 432 monitors the relative position of slidable spool 498 in chamber 538 and is connected to controller 406 by conducting line 433. Housing 540 of spool valve 416 cooperates with slidable spool 500 to define a bypass chamber 542 between orifices 534, 504, and a pressure control chamber 544 at the opposing end of valve 416.

The vacuum-operated, electronically-actuated spool valve assembly 420 has: a spool valve 546 with a housing 548, and a slidable spool 550 with a land 551; a vacuum operator 552 with a push rod 554 operably connectible to spool 550; and, a solenoid valve 556 connected to controller 406 through a conducting line 558. A vacuum source 564 is connected to solenoid 556 through a conduit 560 having an in-line orifice 562. Vacuum operator 552 is connected to solenoid 556 by conduit 566 to thus communicate vacuum power to the operator. Housing 548 defines an inlet port 568, an outlet port 570 and a sump port 572 which communicates to sump 404 through a conduit 574. Inlet port 568 of valve 546 communicates with conduit 442, and outlet port 570 communicates with conduit 346 and thus coolant chamber 348 of clutch 16.

In the fluid control system illustrated in FIGS. 7 and 8, valve assembly 408 operates to control fluid volume flow at line pressure to an input driver assembly of a CVT 10 (see FIG. 1). In FIG. 8, fluid is communicated to spool valve 410 through conduit 403 and, in the position shown, is communicable through passage 528 and orifice 532, to chamber 536 and orifice 502 and thereafter to sump 404. At engine start-up, fluid is communicated to valve 410; there is a fluid volume and pressure in chamber 536 and a similar volume and pressure in FEMA valve 412 chamber 454 which transfers fluid through conduit 524 past orifice 490 in passage 462. As shown, this fluid volume and pressure is also open to sump through port 478, chamber 450 and port 470.

At a command signal from controller 406, based upon the described input parameters and including a signal from proximity probe 432 through line 433, controller 406 analyzes, compares and evaluates the input data, and thereafter generates and passes a control signal to winding 482 of FEMA valve 412. In the present case, such a signal indicates a change from low gear ratio to a higher gear ratio, which implies a movement of movable sheave 68 of input pulley 30 to reduce the sheave gap distance. Current in winding 482 actuates the plunger 486 laterally within chamber 450, to thereby restrict fluid transfer through port 478 with plunger 486. This action then restricts chamber 454 from communication to sump 404 and allows fluid pressure and volume to communicate to chamber 538, to provide a pressure acting on slidable spool 498 and against the fluid pressure on spool 498 by the pressure in chamber 536. Spool 498 moves laterally to balance the pressures in the two chambers and, therefore, to induce further spool movement toward chamber 536. The pressure in chamber 538 is increased by maintaining FEMA valve plunger 486 in flow-restricting proximity to port 478.

As pressure in chamber 538 increases, spool 498 moves toward minimizing chamber 536 volume and operating against a half-line pressure from line 403, and opens communication between conduit 403 and port 510 which is connected to a fluid conduit 511 communicable with a fluid conduit means such as 74 of input pulley 30 (FIG. 1). The control fluid from fluid source 400 is thus communicable to a control chamber of a fluid operated device, herein a CVT pulley. As the pulley 30 attains an adequate fluid supply to its fluid chamber, it moves to a higher gear ratio until it is at its desired gear ratio. At that time, FEMA valve 412 responds to a signal over line 430, and laterally withdraws plunger 486, thereby opening port 478 and reducing the pressure in chamber 454 by allowing fluid flow through chamber 450 to the sump. Therefore, the pressure in spool valve chamber 538 is reduced and as the pressure in chamber 536 is one-half line pressure, spool 498 is moved laterally toward chamber 538 until a balanced pressure condition is attained between chambers 536 and 538. The volume of fluid being transferred at the line pressure is that required to maintain the pulley in this ratio due to fluid loss or leakage. In an idealized state the land of spool 498 would seal communication from line 511 to sump, and pressure and volume in the pulley fluid chamber would be maintained. The FEMA valve 412 is continually responsive to a control signal from controller 406 to adjust the spool position thereby effecting the introduction or withdrawal of control fluid from the sheave chamber. At clutch 16 disengagement, spool 498 is moved laterally to allow control fluid transfer to sump from conduit 511, port 510 and port 497 through land 503. Controller 406 receives a position indicating signal over line 433 from sensor 432, a proximity probe 432 which responds to the position of spool 498. Proximity probe 432 is of a type known in the art as, for example, a Bently-Nevada Corporation electromagnetic pick-up; it is not a fluid transfer point.

Control valve assembly 414, which controls fluid pressure to the output driver pulley 36 and clutch 16 in FIG. 1 and also controls the coolant fluid to clutch 16, is responsive to an electronic signal from controller 406 to FEMA valve 418. Mechanically, spool 500 is laterally slidable in housing 540 in response to pressure changes in chambers 544 and 542. Control valve assembly 414 operates similarly to assembly 408, to control fluid pressure in conduit 401 to the output driver pulley 36 and clutch 16. This valve assembly 414 also controls the coolant fluid in line 442 for clutch 16. Spool valve 416 has a spool 500 which is laterally slidable in housing 540 in response to pressure changes in chambers 544 and 542. The pressure in line 405 and, therefore, in conduit 401 is always controlled by the operation of spool valve 416. This pressure in line 405 is relieved by the movement of spool 500 to communicate fluid through line 405 and port 508 past land 509 to port 572 and conduit 442, which connects to either clutch coolant conduit 346 or to sump 404 as determined by solenoid valve 420.

In this circuit, elevated pressure is required to maintain belt tension to avoid belt slip, and also to engage the wet clutch 16 which requires a fluid pressure in cavity 332 adequate to overcome the negative rate Belleville spring 308 and engage the pressure plate 302 and driven plate 304 through the clutch disc 340. The line pressure in conduit 401 is adequate to supply these needs as well as to supply coolant fluid to wet clutch 16 at clutch engagement.

At clutch 16 engagement, controller 406 passes a signal over line 440 to FEMA valve 418 which causes plunger 488 to move laterally to restrict bore 480. The electrical signal on line 440 is a current-controlled signal which is proportioned to operate plunger 488 to act against a pressure force in chamber 456, which pressure is communicated to chamber 544 of spool valve 416 through conduit 468. This pressure in chamber 544 is the set point pressure which operates to control line pressure through line 405, and which operates against a pressure in chamber 542 of one-half the line 405 pressure. When plunger 488 restricts bore 480, the pressure in chamber 544 increases, which acts to increase the line pressure in line 405 and thus line 401. Again, controller 406 has been continuously receiving, compiling and evaluating input data to produce a controlling signal to FEMA valve 418 as well as valve 412.

At clutch engagement, spool 500 moves to permit fluid communication between ports 508 and 512, to pass fluid through conduit 442 to port 568 of solenoid-controlled valve 546. Spool 550 of valve 546 is operated by a spring biased vacuum operator 552 and push rod 554 that moves spool 550 vertically to communicate fluid between ports 564 and 570, past land 551 of spool 550, and fluid is thus communicated to conduit 346 and chamber 348. Vacuum operator 552 communicates to a vacuum source 564 through conduit 566, solenoid 556 and conduit 560. Solenoid 556 is actuated to open and thereby allow communication of vacuum therethrough by a signal from controller 406 through conducting line 558.

Controller 406 basically comprises a conventional digital computer, coupled with an analog control system. This will be more fully explained in connection with FIGS. 9A-9C. For the present, a general reference to the computer program, or sequential operating steps, is helpful to understand the operation of the fluid control components shown in FIG. 8.

The computer or data processor receives input data, including transmission input speed, output speed, throttle position, gear shift position, line pressure, and a signal indicating the mechanical position of spool 498. Effectively, the processing unit operates to determine the proper transmission mode (such as engine start, stop, forward or reverse), calculates a desired line pressure and engine speed based on the input data, and finally provides output voltages proportional to set points to regulate the FEMA valves and the clutch cooling control valve.

There are three operational modes of the transmission to be considered: (a) dump mode; (b) start mode; and (c) drive mode. Operationally, the processing unit or controller 406 determines a dump mode when the line pressure signal from transducer 407 transmitted to controller 406 is below an electronic set point correlated to a pressure signal (e.g., 30 p.s.i.). This set point is low enough to avoid having clutch 16 transmit any torque to the directional gear selector and thus to the final drive assembly. The engine speed set point at this dump mode condition is at a high enough engine speed to maintain CVT 14 in a low ratio.

In the starting mode, line pressure is a function of engine speed and at idle, the line pressure is low enough to prevent "creep". A set engine speed signal produces a line pressure high enough to transmit full engine torque through clutch 16, and at that set engine speed CVT 14 is maintained or governed in the low ratio.

The drive mode requires a change of belt ratio in the CVT. In this drive mode, a line pressure at any prime mover speed is determined to balance torque requirements, engine output speed and transmission output speed to operationally generate a signal to both FEMA valve assemblies to control fluid line pressure and volume flow. This control of line pressure controls belt tension and torque, as well as clutch 16 operation and engagement. Fluid volume flow at line pressure through valve assembly 408 controls the belt ratio. This controlled pressure is at a calculated value, determined as a function of the transmission ratio and of a magnitude to maintain sufficient belt tension so that slip is prevented. The engine speed in this drive mode is a function of the throttle position and of gear shift position.

In one program developed to implement transmission control, a series of steps were included as logic statements for the program, and implemented as follows:

Start-up Mode: Store Conversion Subroutines:

(1) Steps 1 through 6 are an analog to digital conversion subroutine;

(2) Steps 7 through 20 are a digital to analog conversion subroutine;

(3) Step 21 establishes a set point or control point for an integer constant 'F';

Read Initial Conditions and Determine Mode:

(4) Steps 22 through 25 indicate gearshift position, that is, forward, park, reverse or neutral;

(5) Steps 26 through 28 determine the gear, that is, park, reverse, neutral or forward, and in park or neutral the dump mode is called out;

(6) Steps 29 through 33 determine the engine speed value E as a function of actual engine speed;

(7) Steps 34 through 39 read the throttle position as a signal from an output device;

(8) Steps 40 through 42 determine a set point to select the start or drive mode, and if the set point exceeds a fixed value the next step is in the drive mode, noted at (12) below;

Start Mode:

(9) Step 100 establishes a set point which turns on clutch cooling;

(10) Steps 101 through 104 are used to calculate an output set pressure and generate a control signal to set line pressure;

(11) Steps 105 and 106 determine an output set engine speed value for moving to a low belt ratio. Steps 100 through 108 imply the start mode is operative;

Drive Mode:

(12) Step 200 sets a lugging limit for engine speed;

(13) Step 201 evaluates the lugging limit from step 200;

(14) Steps 202 through 207 turn off the clutch coolant at clutch lock up, and determines transmission output speed;

(15) Step 208 is a safety step to avoid error signals at a later step;

(16) Steps 209 through 212 determine an output set pressure, to maintain sufficient belt tension to keep belt 42 from slipping;

(17) Steps 213 through 221 calculate an output set engine speed as a function torque and gear, using the throttle position information developed in (7) above;

(18) Step 222 sets a new value for an earlier-developed constant indicating the driving mode, and iterates the program cycle to statement (4) above;

Dump Mode:

(19) Step 300 turns off the clutch cooling when the vehicle is in a park or neutral gear position;

(20) Steps 301 and 302 reset the output set pressure signal;

(21) Steps 303 and 304 reset the output engine set speed signal to operate within the requirements, that is, at a low belt ratio; and

(22) Steps 305 and 306 reset the value of the constant developed in (18), and the program continues to test the values of the input parameters until the variables indicate a driving mode.

In general, the program cycle requires a repeated iteration through the above steps to evaluate the measured or sensed input signals, perform a calibrating function based on these inputs, and thereafter generate operating set signals to the various control solenoids to control fluid pressure and flow. With this background, a description of the electronic controller 406 will now be set out.

Figure 9A:
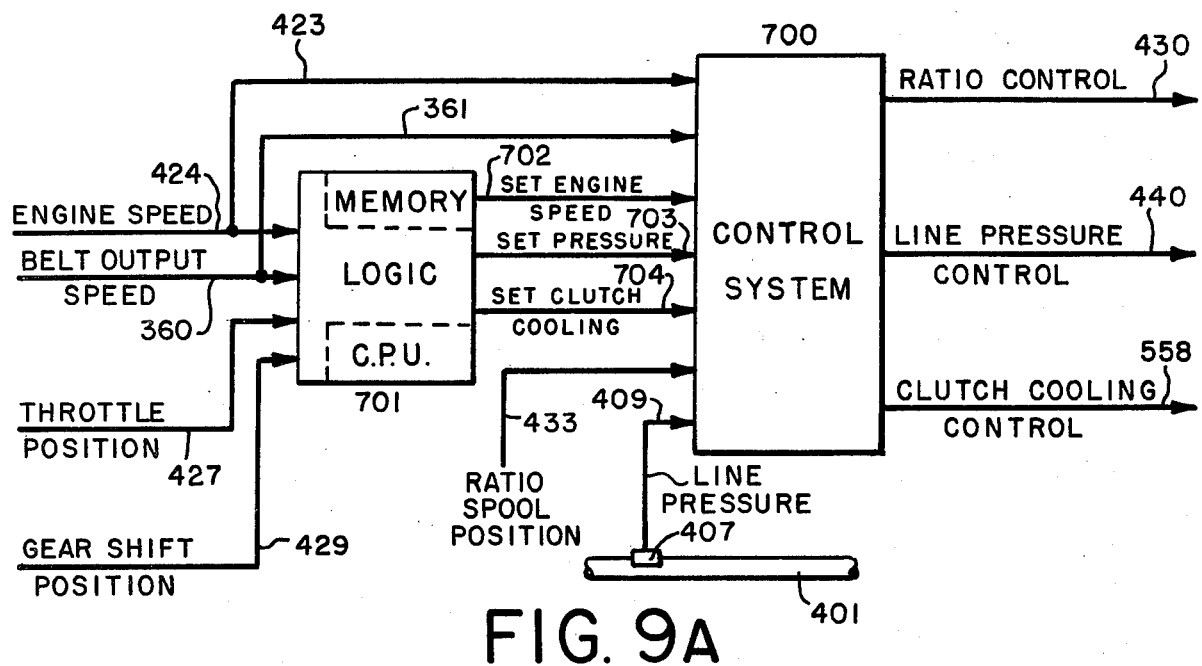
FIGS. 9A and 9B are block diagrams.

FIG. 9A illustrates in a general manner the reception of the information including the engine speed, belt output speed, throttle position, and gear shift position, for use in controller 406. The system produces control signals to regulate ratio of the transmission, pressure in fluid line 401 to maintain the belt tension, and actuation of solenoid valve 420 to regulate the clutch cooling. This regulation is performed in a control system 700 coupled in series with a conventional computer 701. The memory of computer 701 stores information including desired curves or functions for regulating the vehicle engine to operate at the most efficient speed. For a given throttle opening, one engine speed provides the most efficient operation, and so the system operates to produce that engine speed. In the embodiment successfully built and tested, a microprocessor of the Texas Instruments 9900 type was utilized to store these functions and perform the associated operations. Then when a given throttle position is sensed over line 427, the desired speed is calculated from the stored functions, and the system recognizes when that speed is attained. With the signals already described, the output of computer 701 provides three "set" or regulating signals to control system 700. The first is a "set engine speed" signal on line 702, which after certain operations in the control system, is utilized to provide the ratio control signal on line 430. The second is a "set pressure" signal on line 703, used to develop the line pressure control signal on line 440 at the output side of the control system. The third is a "set clutch cooling" signal on line 704, which is not altered except for amplification in control system 700, and is thus used to provide the clutch cooling control signal on line 558. Major loop and minor loop controls are utilized, and the ratio spool position signal on line 433 and the line pressure signal on line 409 are employed for this purpose. The general functions of control system 700 will be better understood in connection with the showing of FIG. 9B.

As there shown the engine speed and set engine speed signals are applied to the inputs of a comparator stage 705, which on its output line 706 provides an error signal related to the error or difference between the desired engine speed, represented by the set engine speed signal on line 702, and the actual engine speed, denoted by the signal on line 423. The error signal passes through a lead/lag compensation network 707, to ensure the proper phase relationship of the output signal passed over line 708 to one input connection of another comparator 710. The other input of this comparator receives the spool position indicating signal over line 433 from the ratio-controlling amplifier valve 410. Thus this comparator 710 is in a minor control loop, utilizing information concerning the position of the spool in valve 410 to enhance the stability of the ratio (or speed) control loop. The output of comparator 710 is the ratio control signal which is passed over electrical line 430 to the solenoid of the FEMA valve 412, to regulate the position of the movable primary sheave and correspondingly regulate the transmission ratio.

Figure 9B:
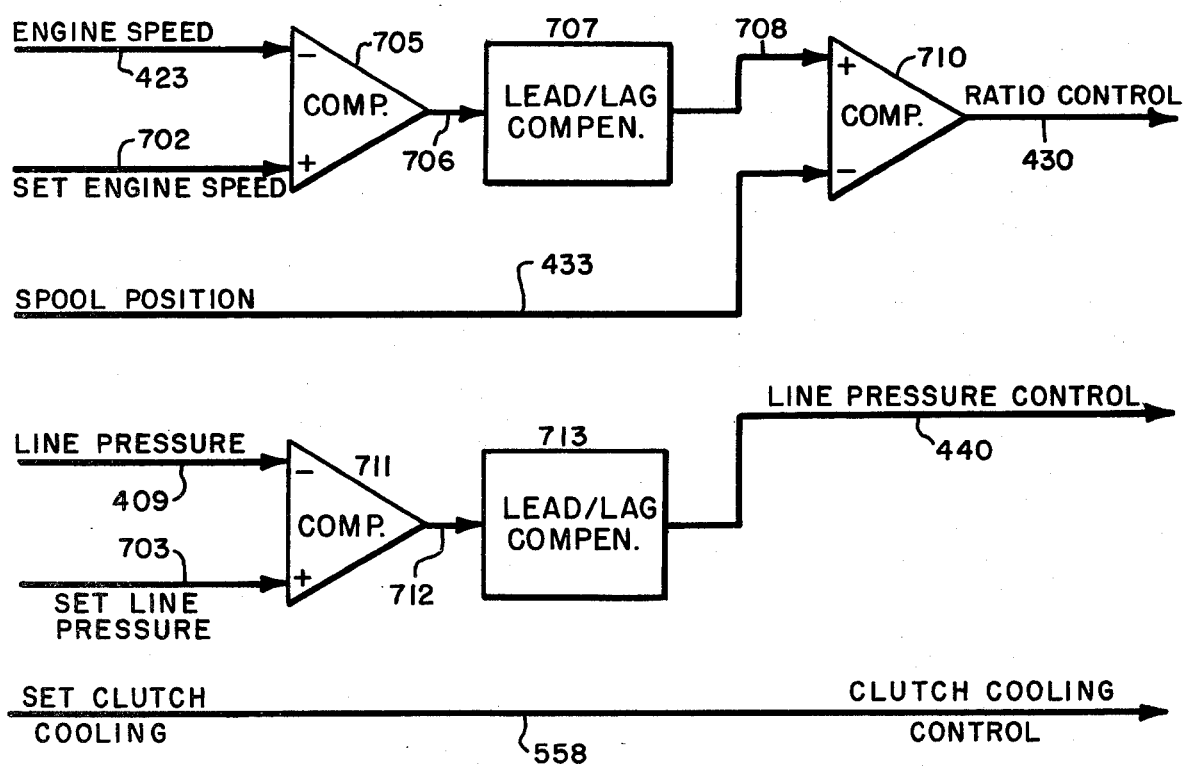

In the pressure control loop, a comparator 711 receives a line pressure signal over line 409 from transducer 407, and a set line pressure signal over line 703 from the computer. The error signal output from comparator 711 is passed over line 712 to another lead/lag compensation network 713. The output of this compensation network, after amplification, is passed over line 440 to regulate the other FEMA valve 418, to control the line pressure in the fluid system. This is a part of the major control loop for the line pressure regulated in the system. Because the amplification arrangement is a standard circuit, the different amplifiers or drivers for the three output signals shown in FIG. 9B are not illustrated, either there or in the schematic showing of FIG. 9C. In FIG. 9B, those skilled in the art will appreciate that an amplification stage is included in line 558 representing the clutch cooling control signal, but there is no other modification of the clutch cooling signal and so the amplifier showing is omitted.

In the more detailed showing of FIG. 9C, an analog divider stage 715 is provided as shown in the input side of the ratio control circuit. This stage in an actual embodiment was a type BB4291J circuit, with the pin connections as shown to provide a ratio denoting output signal on conductor 716 to one terminal of the switch 717. In the illustrated position of this switch, the analog divider is effectively bypassed and the engine speed signal is passed over conductor 718, contacts of switch 717, and the 24.9K resistor to the inverting input connection of comparator 705. This stage also receives the set engine speed signal as already described. The output signal from this stage is passed over conductor 706 to the lead/lag compensation network, which includes op amp 720, together with the circuitry associated with the op amp. Thus the phase-compensated output signal, which is the engine speed error signal, is dropped across potentiometer 721. The setting of this potentiometer establishes the gain the ratio control portion of control system 700. The resultant signal from the wiper of potentiometer 721 is passed over the 100K resistor to the positive input connection of another op amp 722. This same input connection also receives another input signal from the spool position line 433, after this signal is divided down across the illustrated network. The other connection from the same input terminal of op amp 722 extends over the 301K resistor to the wiper of a 10K potentiometer 723. This potentiometer is connected between ground and, through the 50K resistor, to conductor 409 which receives the actual line pressure signal from the transducer in fluid line 401. Potentiometer 723 provides an adjustment of the bias to op amp 722, and relates the ratio control circuit to line pressure, as the ratio-controlling FEMA valve 412 also works from line pressure. The 10K potentiometer 724 connected to the inverting input of op amp 722 provides an adjustment in the circuit corresponding to the physical offset of the spool position in valve 410. Those skilled in the art will understand that suitable amplification means, or a voltage-to-current amplifier, can be connected between output conductor 430 and the FEMA valve 412 to ensure the requisite signal level and polarity are provided.

In the lower portion of FIG. 9C the pressure control circuit is depicted. The set pressure signal is received over line 703, and appears across the 10 K potentiometer 725. Potentiometer 725 is a means for matching the computer signal with the desired signal level required in control system 700, if any adjustment is necessary. The wiper of this potentiometer is coupled over the 10 K resistor to the plus input connection of comparator 711, and the actual line pressure signal on line 409 is passed to its other input connection. Another lead/lag compensation network is provided, including op amps 726 and 727. The 50 K potentiometer 728 provides a means for gain adjustment in the pressure control loop of the control system. Below the compensation network, another potentiometer 730 allows the system to be set so that the open loop value of the set pressure signal, received from the computer, can effectively bypass the comparator 711 and the lead/lag compensation network including op amps 726 and 727, and be applied directly to the inverter stage 731. The output of the inverter, after suitable amplification, is then passed over line 440 to regulate the operation of pressure control valve 418.

In operation, the system is energized from the normal vehicle electrical system (not shown) in a conventional manner. After energization, the drive mode selector or gear shift lever is displaced into a forward to reverse position, and this signal appears on line 429 (FIG. 9A). The engine is started, providing an engine speed signal on line 424, and a belt output speed signal on line 360, as the secondary pulley is always driven whenever the primary pulley is rotated. These two speed signals, on lines 424 and 360, are used in connection with the functions stored in the memory of computer 701 to select a desired engine operating speed, which is passed over line 702 to control system 700. Although the belt output speed signal is also passed to the control system, this signal is only used for calculations in the computer, and in the control system is used only in a test circuit function. As the driver indicates torque demand by stepping on the pedal to open the throttle, this signal is passed over line 427 to the computer, for use in providing the set pressure signal on line 703 to the control system. The gear shift position signal on line 429 is particularly useful, in connection with the program stored in computer 701, and already described, to actuate solenoid valve 420 and return the waste oil directly to sump, rather than being used to cool the clutch. When the vehicle is in an idle condition, or is stopped without transmitting torque through the drive train, the coolant fluid is not passed to the clutch. The information on lines 427 and 429 is helpful in connection with the functions stored in computer 701, to regulate dumping of the clutch. Different computer arrangements can be utilized, and the Texas Instruments 990 family of processors has proved suitable for providing the requisite signals to control system 700. For purposes of the present invention and the appended claims, the computer can be considered as means for receiving the information signals depicted in FIG. 9A, processing this information in conjunction with the stored functionals, and producing the "set" signals shown on lines 702, 703 and 704 for use in the control system.

When the driver desires to accelerate the vehicle, he produces a different throttle position signal on line 427. If the transmission is in underdrive, as the vehicle accelerates up to the stall point the ratio remains the same, until the clutch locks up. During this acceleration the actual engine signal is received over line 423 (FIG. 9C), then passed to comparator 705, which also receives the set engine speed signal on line 702. For practical purposes the belt output speed is not used in control system 700, as ratio-engine speed switch 717 is only displaced to the ratio position for test purposes. If desired, analog divider 715 can be removed from the circuit and the engine speed signal applied directly over the 24.9K resistor to op amp 705. The resultant error signal, after phase compensation and incorporation of the spool position signal in stage 722, is used to provide the appropriate electrical control signal on line 430 to regulate FEMA valve 212. Those skilled in the art will appreciate that valves 412 and 410 can be considered as a single valve assembly, for using an electrical signal (such as the ratio control signal) to regulate a reference flow (in the supply line 403) to a different level (in line 511) for setting the effective diameter of the primary pulley, thus determining the ratio of the transmission. In the same way valves 416, 418 can be considered a single valve assembly for regulating the effective flow in supply line 401 as a function of the electrical signal received over line 440 from the control system. Controller 406 shown as a block in FIGS. 4 and 5 is the same control arrangement represented by blocks 700, 701 in FIG. 9A. The term "control arrangement" as used in the appended claims refers to the combination of a conventional processor such as 701 in FIG. 9A with associated control circuitry, such as that shown generally in block 700 and in more detail in FIG. 9C, to provide the control signals for operating the continuously variable transmission with a slipping clutch on the secondary axis in an optimum manner.

In the appended claims, a "control arrangement" includes both electronic and fluid components, such as those within rectangle 22 in FIG. 7. A "controller" includes the electrical components, such as those shown in FIG. 9A. An "electromechanical valve assembly" such as 40B (FIG. 7) in this embodiment includes two valves, 412 and 410, but those skilled in the art will appreciate that one valve can be utilized to translate an electrical signal into a fluid signal. The term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

We claim:

1. A control arrangement for a continuously variable transmission in which a primary pulley receives drive from an engine, a secondary pulley is coupled over a belt to the primary pulley, and a fluid-cooled clutch transfers drive from the secondary pulley to a driven means, with each of the pulleys having an axially movable sheave to effect ratio change of the transmission and to maintain belt tension, which control arrangement comprises
    a first electromechanical valve assembly connected to provide a first fluid signal to the movable sheave to provide a first fluid signal to the movable sheave of the secondary pulley to regulate the belt tension level,
    a second electromechanical valve assembly connected to provide a second fluid signal to the movable sheave of the primary pulley to regulate the transmission ratio, and
    a controller connected to provide electrical control signals to both valve assemblies as a function of received input signals including engine speed, belt output speed, throttle position, and gearshift position, to govern the transmission to operate at an optimum condition for the conditions signified by the received input signals.

2. A control arrangement as claimed in claim 1, in which the controller includes a computer connected to receive said input signals and to provide a set engine speed signal and a set pressure signal, and a control system connected to receive said set signals, to provide a line pressure control signal to the first electromechanical valve assembly as a function of the set pressure signal, and to provide a ratio control signal to the second electromechanical valve assembly as a function of the set engine speed signal.

3. A control arrangement as claimed in claim 2, and further comprising a transducer connected to provide a feedback signal, related to the first fluid signal, to the control system for use with the set pressure signal to produce the pressure control signal.

4. A control arrangement as claimed in claim 2, and further comprising a transducer connected to provide a feedback signal, related to a mechanical position in the second electromechanical valve assembly, to the control system for use with the set engine speed signal to produce the ratio control signal.

5. A control arrangement as claimed in claim 1, in which a solenoid-controlled valve is coupled between the fluid-cooled clutch and the first electromechanical valve assembly, to divert the cooling fluid directly to a sump rather than cooling the clutch when the gearshift position signal indicates neutral and when the transmission commences a shift after the clutch has been locked up, to avoid unnecessary drag losses.

6. A control arrangement as claimed in claim 5, in which the controller regulates operations of the solenoid-controlled valve as a function of the received input signals.

7. A control arrangement for a continuously variable transmission including a primary pulley for receiving drive from an engine, a secondary pulley, a belt coupling the secondary pulley to the primary pulley, and a fluid-cooled clutch connected to transfer dirve from the secondary pulley to a driven means, with the primary pulley having an axially movable sheave to effect ratio change of the transmission and the secondary pulley having an axially movable sheave to regulate belt tension in the system, a fluid supply line connected to receive fluid under pressure, and also coupled to the movable sheave of the secondary pulley, which control arrangement comprises
    a first electromechanical valve assembly, coupled to the supply line, connected to regulate the supply line pressure passed to the movable sheave of the secondary pulley and thus regulate the belt tension level,
    a second electromechanical valve assembly, coupled to the supply line, connected to regulate fluid flow to the movable sheave of the primary pulley and thus regulate the transmission ratio, and
    a controller including a computer connected to received input signals including signals representing engine speed, belt output speed, throttle position, and gearshift position, and to provide a set engine speed signal and a set pressure signal, and a control system connected to receive said set signals, to provide a line pressure control signal to the first electromechanical valve assembly as a function of the set pressure signal, and to provide a ratio control signal to the second electromechanical valve assembly as a function of the set engine speed signal.

8. A control arrangement as claimed in claim 7, and further comprising a pressure-sensing transducer, connected to provide a feedback signal, related to the supply line pressure, to the control system for use with the set pressure signal to produce the pressure control signal.

9. A control arrangement as claimed in claim 7, in which the second electromechanical valve assembly includes a spool, with the spool position regulating the fluid flow to the primary pulley movable sheave, and further comprising a pressure-sensing transducer, connected to provide a feedback signal related to the mechanical position of said spool to the control system, for use with the set engine speed signal to produce the ratio control signal.

10. A control arrangement as claimed in claim 7, in which a solenoid-controlled valve is coupled between the fluid-cooled clutch and the first electromechanical valve assembly, to direct the cooling fluid directly to a sump rather than cooling the clutch when the gearshift signal indicates neutral and when the transmission commences a shift after the clutch has been locked up, to avoid unnecessary drag losses.

11. A control arrangement as claimed in claim 10, in which the controller regulates operation of the solenoid-controlled valve as a function of the received input signals.

* * * * *

UNITED STATES PATENT AND TRADEMARK OFFICE
CERTIFICATE OF CORRECTION

PATENT NO. : 4,458,318

DATED : July 3, 1984

INVENTOR(S) : Geoffrey N. Smit, Scott R. Anderson, Shan-Chin Tsai

It is certified that error appears in the above—identified patent and that said Letters Patent is hereby corrected as shown below:

Column 22, line 24, cancel "dirve" and insert -- drive --.

Signed and Sealed this

Nineteenth Day of February 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,458,318

DATED : July 3, 1984

INVENTOR(S) : Geoffrey N. Smit, Scott R. Anderson and Shan-Chin Tsai

It is certified that error appears in the above—identified patent and that said Letters Patent is hereby corrected as shown below:

Column 22, line 2, (Claim 4), cancel "transducer" and insert -- proximity probe --.

Column 22, line 64, (Claim 9), cancel "pressure-sensing transducer" and insert -- proximity probe --.

Signed and Sealed this

Twentieth Day of May 1986

[SEAL]

Attest:

DONALD J. QUIGG

Attesting Officer

Commissioner of Patents and Trademarks